United States Patent
Sourwine

(10) Patent No.: US 8,006,648 B1
(45) Date of Patent: Aug. 30, 2011

(54) POWER-ACTUATED PAW CLEANING DEVICE AND ASSOCIATED METHOD

(76) Inventor: Erich Sourwine, Kenneyville, IL (US)

( * ) Notice: Subject to any disclaimer, the term of this patent is extended or adjusted under 35 U.S.C. 154(b) by 156 days.

(21) Appl. No.: 12/384,655

(22) Filed: Apr. 7, 2009

Related U.S. Application Data

(60) Provisional application No. 61/123,156, filed on Apr. 7, 2008.

(51) Int. Cl.
*A01K 13/00* (2006.01)
(52) U.S. Cl. .................. 119/609; 15/23; 15/24; 119/664
(58) Field of Classification Search ................ 119/608, 119/609, 652, 651, 663, 664, 633; 15/23, 15/24, 248.1, 248.2, 230.11, 247
See application file for complete search history.

(56) References Cited

U.S. PATENT DOCUMENTS

| | | | | |
|---|---|---|---|---|
| 594,952 | A * | 12/1897 | Hoyer | 433/116 |
| 1,340,040 | A * | 5/1920 | Gasser | 15/23 |
| 1,743,898 | A * | 1/1930 | McCauley | 15/23 |
| 1,833,967 | A * | 12/1931 | Groff, Jr. | 15/23 |
| 2,660,746 | A * | 12/1953 | Ward | 15/141.2 |
| 2,723,407 | A * | 11/1955 | Bardon | 15/24 |
| 2,753,583 | A * | 7/1956 | Jepson | 15/246 |
| 2,959,797 | A * | 11/1960 | Harman | 15/3.1 |
| 3,274,637 | A * | 9/1966 | Schulze | 401/208 |
| 3,495,574 | A * | 2/1970 | Zook | 119/609 |
| 4,084,282 | A * | 4/1978 | Calvert | 15/38 |
| 4,317,431 | A | 3/1982 | Sparkes | |
| 4,571,769 | A * | 2/1986 | Ford | 15/230.11 |
| 4,922,859 | A * | 5/1990 | Durell et al. | 119/603 |
| 5,090,085 | A * | 2/1992 | Jarecki et al. | 15/248.2 |
| 5,702,525 | A * | 12/1997 | Liou | 118/200 |
| 5,746,531 | A * | 5/1998 | Izhak | 401/139 |
| 5,794,296 | A * | 8/1998 | Wong | 15/23 |
| 6,324,713 | B1 * | 12/2001 | Barkley | 15/23 |
| 6,374,446 | B1 * | 4/2002 | Gleason | 15/4 |
| 6,439,160 | B1 | 8/2002 | WheelWright | |
| 6,851,391 | B1 | 2/2005 | Mulich | |
| 7,246,573 | B2 * | 7/2007 | Dunn et al. | 119/632 |
| 7,621,234 | B2 * | 11/2009 | Roy | 119/628 |
| 7,665,422 | B2 * | 2/2010 | Kissel, Jr. | 119/609 |
| 7,861,357 | B1 * | 1/2011 | Porter | 15/111 |
| 2006/0230555 | A1 * | 10/2006 | Yang | 15/23 |
| 2008/0172825 | A1 * | 7/2008 | Weiss | 15/389 |

* cited by examiner

*Primary Examiner* — Rob Swiatek
*Assistant Examiner* — Ebony Evans

(57) ABSTRACT

A power-actuated animal paw cleaning device including an elongated handle having an anchor rod statically coupled to a distal end thereof, a casing pivotally mated to the anchor rod such that the casing is freely pivotal thereabout while the handle and anchor rod remain stationary, a splash guard pivotally coupled to the anchor rod and adjoined to an interior surface of the casing respectively, and a paw cleaning mechanism attached to the casing and the handle respectively. Such a paw cleaning mechanism is preferably provided with a brush head rotatably situated within the casing. In one embodiment, the present invention may further include a reservoir containing a liquid cleaning solution therein. Such a liquid cleaning solution may be directly deposited onto a paw of the animal prior to or during cleaning procedures for loosening debris, for example.

19 Claims, 12 Drawing Sheets

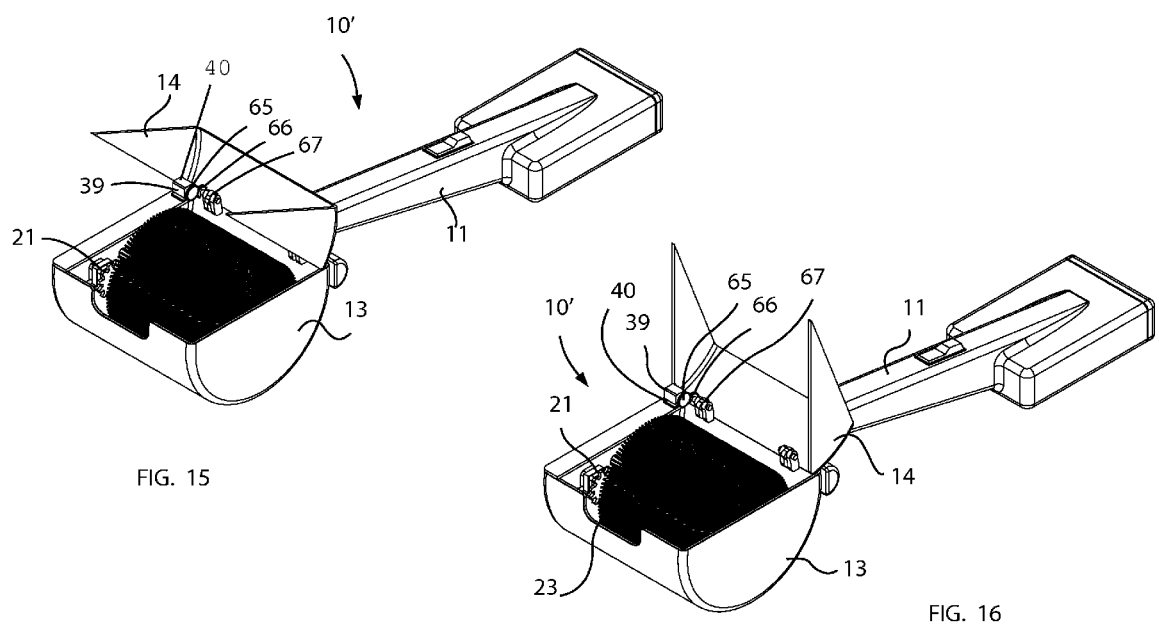

POWER-ACTUATED PAW CLEANING DEVICE AND ASSOCIATED METHOD

CROSS REFERENCE TO RELATED APPLICATIONS

This application claims the benefit of U.S. Provisional Application No. 61/123,156, filed Apr. 7, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to cleaning devices and, more particularly, to a paw cleaning device for pets and the like for providing pet owners and groomers with a convenient means of quickly and easily cleaning the paws of dogs and the like.

2. Prior Art

Washing a small pet such as a dog is a common, yet often dreaded, chore. Pet washing is often undertaken indoors using a conventional bathtub or outdoors using a tub or garden hose. However, a more frequently encountered need is to merely clean the dirty paws of an animal before the animal is permitted to come indoors. A complete washing of the animal is simply unnecessary and undesirable in this instance. Various apparatus have been proposed in the prior art for the complete washing of a pet such as a dog. Existing devices, however, are not particularly adapted for the thorough cleaning of the paws of a pet.

Accordingly, a need remains for a paw cleaning device for pets and the like in order to overcome the above-noted shortcomings. The present invention satisfies such a need by providing a device that is convenient and easy to use, is durable yet lightweight in design, is versatile in its applications, and provides users a simple means of safely cleaning their animal's paws.

BRIEF SUMMARY OF THE INVENTION

In view of the foregoing background, it is therefore an object of the present invention to provide a power-actuated animal paw cleaning device for assisting a caregiver to groom an animal paw. These and other objects, features, and advantages of the invention are provided by a power-actuated animal paw cleaning device including an elongated handle having an anchor rod statically coupled to a distal end thereof, a casing pivotally mated to the anchor rod such that the casing is freely pivotal thereabout while the handle and the anchor rod remain stationary, a splash guard pivotally coupled to the anchor rod and adjoined to an interior surface of the casing respectively, and a paw cleaning mechanism attached to the casing and the handle respectively. Such a paw cleaning mechanism is preferably provided with a brush head rotatably situated within the casing.

In one embodiment, the present invention may further include a reservoir containing a liquid cleaning solution therein. Such a liquid cleaning solution may be directly deposited onto a paw of the animal prior to or during cleaning procedures for loosening debris, for example.

Advantageously, the splash guard is independently articulated along a first arcuate path as the paw cleaning mechanism is independently articulated along a second arcuate path. In this manner, a rotational displacement of the splash guard is independently adjusted regardless of a rotational velocity of the brush head. For example, the rotational displacement of the splash guard is manually actuated by a user as the rotational velocity of the brush head increases and decreases and thereby enables the user to pivot the splash guard between open and closed positions for prohibiting the cleaning solution from splattering beyond the distal end of the handle.

In one embodiment, the paw cleaning mechanism may further include a motor and a power source electrically coupled thereto, a user interface communicatively coupled to the motor for selectively toggling the brush head between alternating rotational velocities.

The paw cleaning mechanism may further include a drive gear directly connected to the motor. Such a drive gear is caused to revolve along a first direction during operating conditions. A driven gear may be directly connected to the drive gear and caused to automatically revolve along a second direction when the drive gear revolves along the first direction. The paw cleaning mechanism may further include a rectilinear driven shaft concentrically disposed about said anchor rod and statically coupled to the driven gear. Such a driven shaft is rotatably supported within the casing respectively. Notably, the driven shaft is further mated to the brush head and thereby causes the brush head to revolve along the second direction when the drive gear revolves along the first direction respectively.

The rectilinear shaft and the anchor rod may be coaxially aligned such that the anchor rod remains statically coupled to the casing while the rectilinear shaft rotates about the anchor rod. In this manner, both the splash guard and the casing may be freely rotated along the first arcuate path while the handle and the anchor rod are maintained at a static position so that the caregiver is able to maintain adequate leverage during cleaning procedures.

In one embodiment, the casing may further include a notch formed at an anterior face thereof. Such a notch is adapted to receive the animal paw therethrough during cleaning procedures while the splash guard is simultaneously biased towards a closed position.

The present invention may further include a method of utilizing a power-actuated animal paw cleaning device for assisting a caregiver to groom an animal paw. Such a method preferably includes the chronological steps of: providing an elongated handle having an anchor rod statically coupled to a distal end thereof; providing and pivotally mating a casing to the anchor rod such that the casing is freely pivotal thereabout while the handle and the anchor rod remain stationary; providing and adjoining a splash guard to an interior surface of the casing by pivotally coupling the splash guard to the anchor rod; providing and attaching a paw cleaning mechanism to the casing and the handle respectively by providing and rotatably situating a brush head within the casing; independently articulating the splash guard along a first arcuate path as the paw cleaning mechanism is independently articulate along a second arcuate path; and independently adjusting the rotational displacement of the splash guard and a rotational velocity of the brush head.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIGS. 15 and 16 are front perspective views showing the splash guard independently pivoted to various positions.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
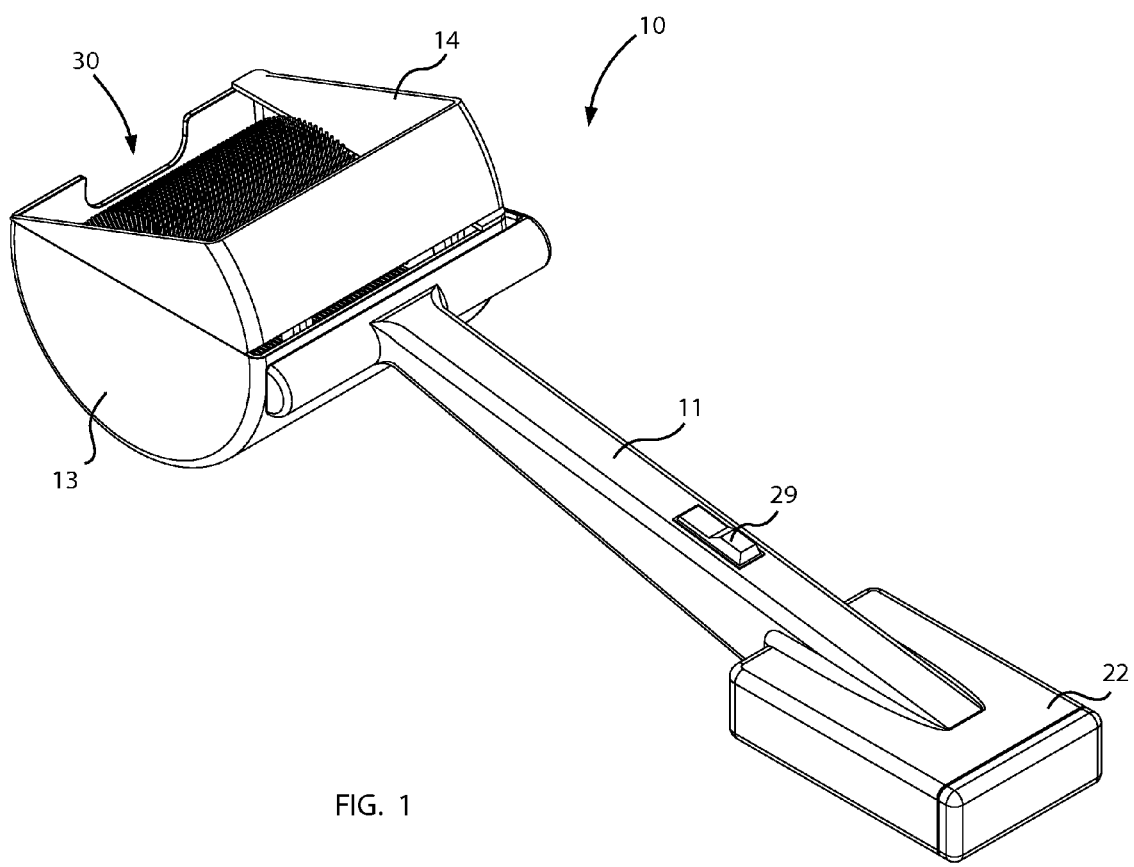
FIG. 1 is a perspective view showing a rear side of a power-actuated paw cleaning device, in accordance with the present invention.
Figure 2:
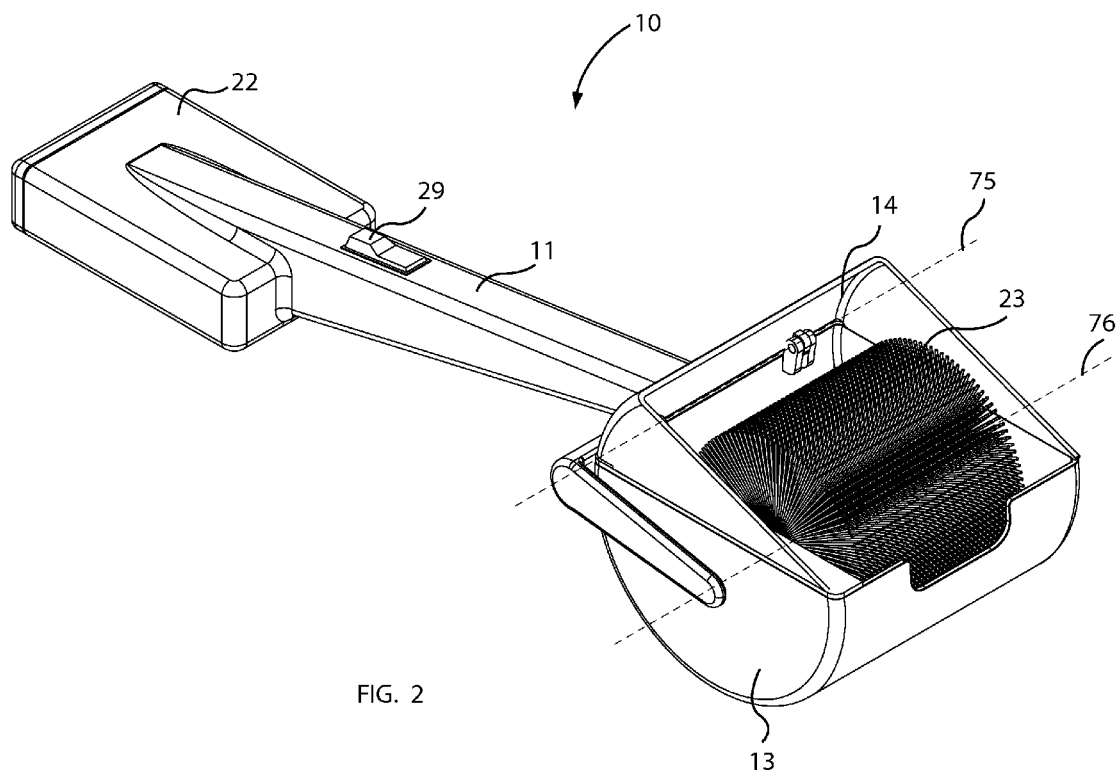
FIG. 2 is a perspective view showing a front side of the power-actuated paw cleaning device.
Figure 3:
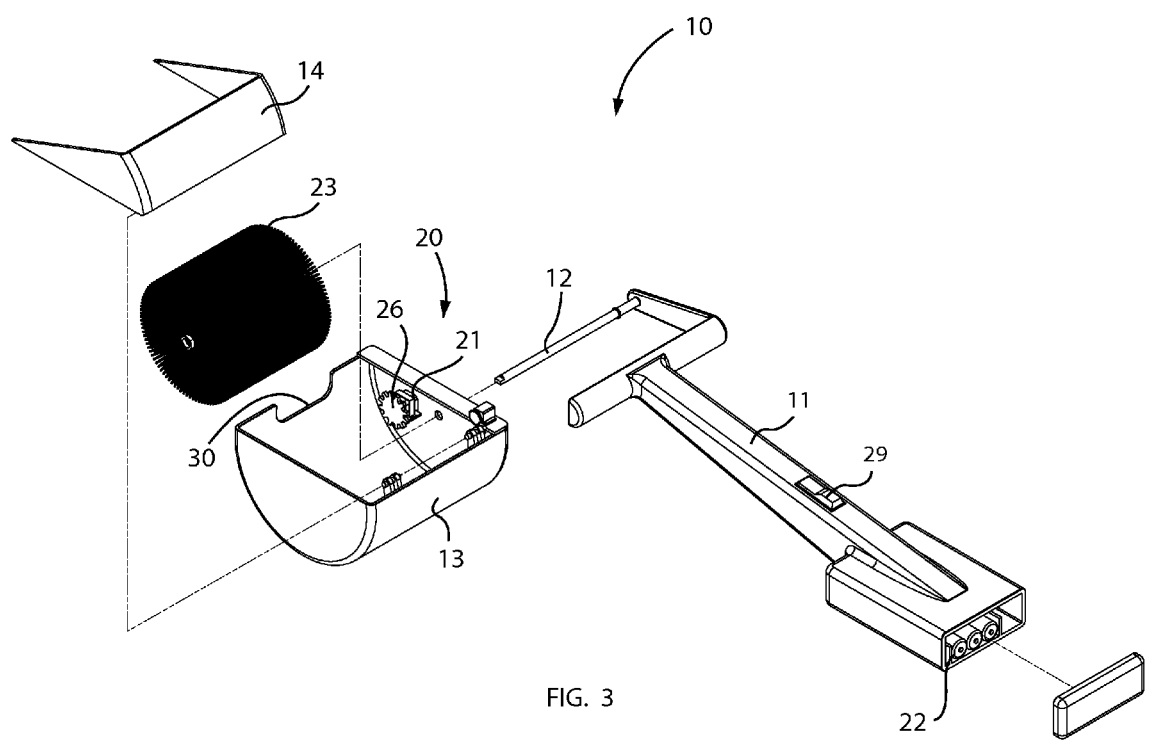
FIG. 3 is an exploded view of FIG. 1.
Figure 4:
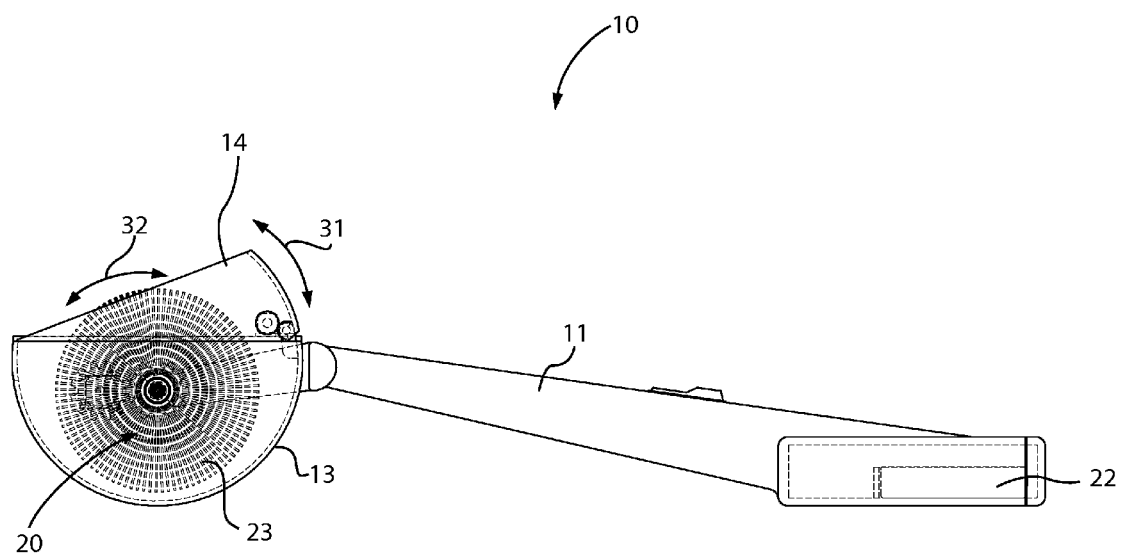
FIG. 4 is a side elevational view of the device shown in FIG. 1.
Figure 5:
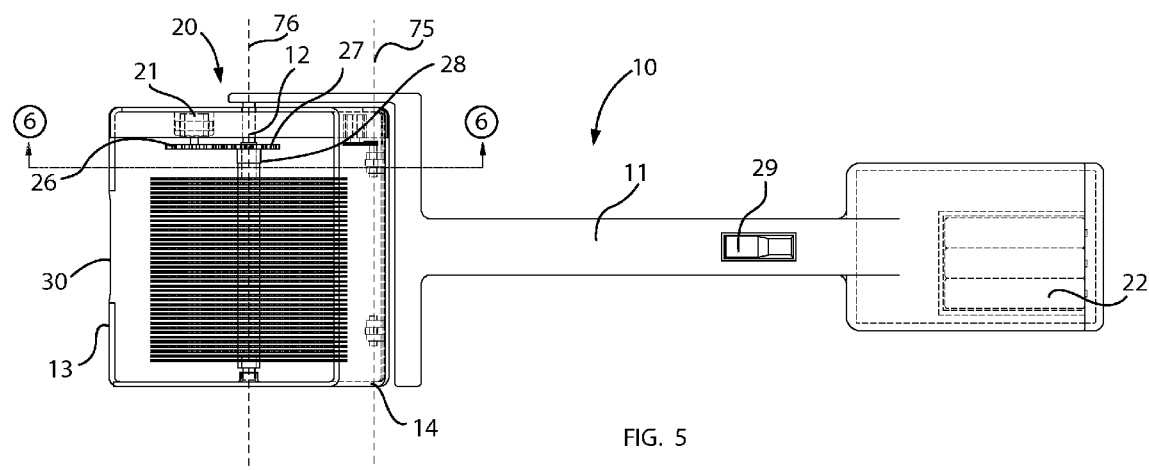
FIG. 5 is a top plan view of the device shown in FIG. 1.
Figure 6:
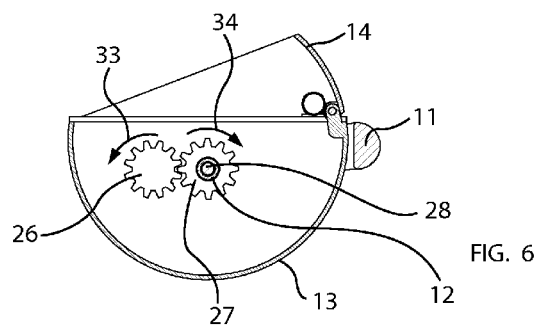
FIG. 6 is a cross-sectional view taken along line 6-6 in FIG. 5.
Figures 7, 8:
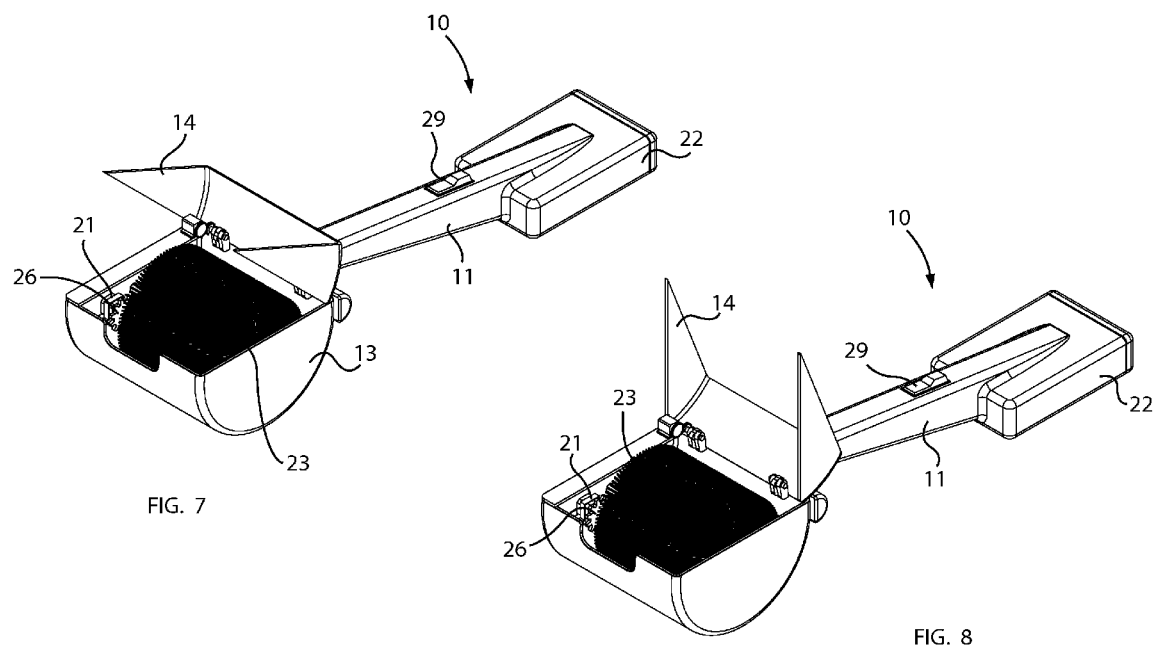
FIGS. 7 and 8 are front perspective views showing the splash guard independently pivoted to various positions.
Figure 9:
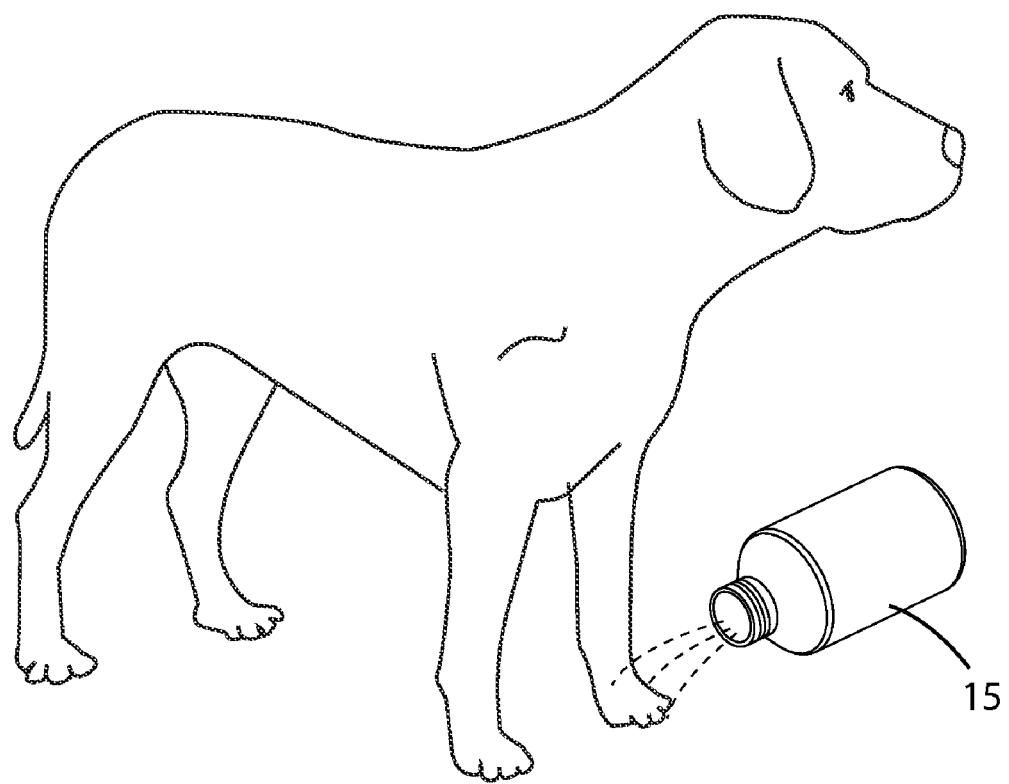
FIG. 9 is a perspective view of the reservoir containing the liquid cleansing solution therein.
Figure 10:
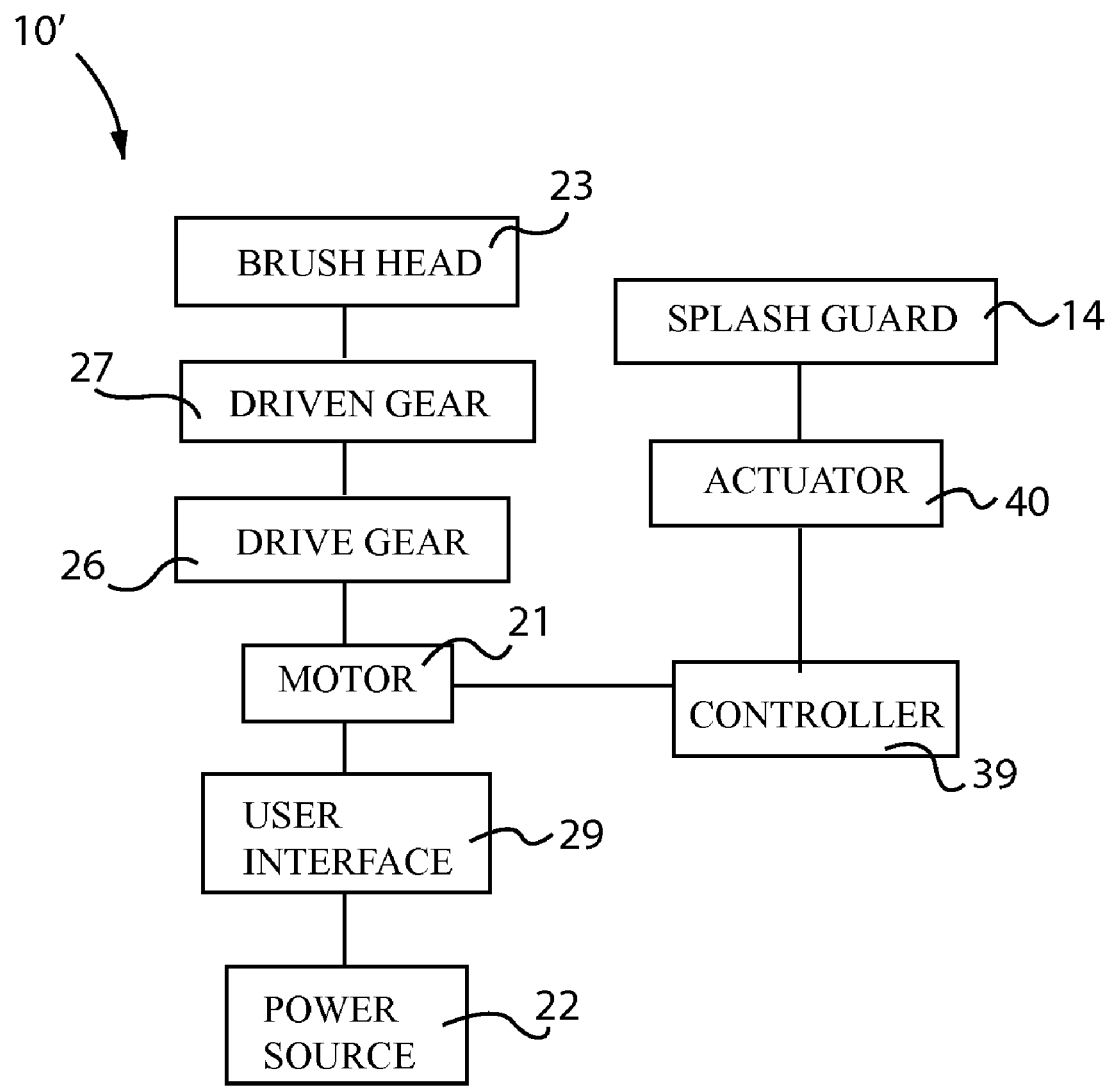
FIG. 10 is schematic block diagram showing the interrelationship between the major electronic components of the paw cleaning mechanism and splash guard actuator, in accordance with an alternate embodiment of the present invention.

The device of this invention is referred to generally in FIGS. 1-10 by reference numeral 10 and is intended to provide a power-actuated animal paw cleaning device. It should be understood that the power-actuated animal paw cleaning device 10 may be used to clean many different types of animal paws and should not be limited to any particular animal breed or species.

As a motorized scrub brush containing soft fiber bristles, the present invention 10 easily eradicates dirt and debris from the surface of the animal's paw, as well as any foreign substance which may be stuck between the pad of the foot. By eradicating harmful debris from an animal's paw, use of the device 10 also ensures that mud, dust, and other debris are not tracked into the home by the animal. As such, use of the present invention 10 enables the pet owner to easily maintain pristine floors and carpets. By making the task of washing the paws a more pleasant experience for both the animal and the pet owner, the present invention 10 overcomes prior art shortcomings.

A power-actuated animal paw cleaning device 10 includes an elongated handle 11 having an anchor rod 12 statically coupled to a distal end thereof, a casing 13 pivotally mated to the anchor rod 12 such that the casing 13 is freely pivotal thereabout while the handle 11 and the anchor rod 12 remains stationary, a splash guard 14 pivotally coupled to the anchor rod 12 and adjoined to an interior surface of the casing 13 respectively, and a paw cleaning mechanism 20 attached to the casing 13 and the handle 11 respectively. Such a paw cleaning mechanism 20 is preferably provided with a brush head 23 rotatably situated within the casing 13.

In one embodiment, the present invention 10 may further include a reservoir 15 containing a liquid cleaning solution therein. Such a liquid cleaning solution (inherently understood to be contained within reservoir 15) may be directly deposited onto a paw of the animal prior to or during cleaning procedures for loosening debris, for example. Such a cleaning solution may include a conventional liquid cleanser, well known by one skilled in the art.

Advantageously, the splash guard 14 is independently articulated along a first arcuate path 31 as the brush head 23 is independently articulated along a second arcuate path 32. In this manner, a rotational displacement of the splash guard 14 is independently adjusted as a rotational velocity of the brush head 23 is independently adjusted. For example, the rotational displacement of the splash guard 14 is independently biased between open and closed positions as the rotational velocity of the brush head 23 increases and decreases. In this manner, a user is able to independently articulate the splash guard 14 between open and closed positions while the brush head 23 speed is manipulated, for prohibiting the cleaning solution from splattering beyond the distal end of the handle 11.

In one embodiment, the paw cleaning mechanism 20 may further include a motor 21 and a power source 22 electrically coupled thereto, a user interface 29 communicatively coupled to the motor 21 for selectively toggling the brush head 23 between alternating rotational velocities.

The paw cleaning mechanism 20 may further include a drive gear 26 directly connected to the motor 21. Such a drive gear 26 is caused to revolve along a first direction 33 during operating conditions. A driven gear 27 may be directly connected to the drive gear 26 and caused to automatically revolve along a second direction 34 when the drive gear 26 revolves along the first direction 33. The paw cleaning mechanism 20 may further include a rectilinear driven shaft 28 statically mated to the driven gear 27 and rotatably supported within the casing 13, respectively. Notably, the driven shaft 28 is further mated to the brush head 23 and thereby causes the brush head 23 to revolve along the second direction 34 when the drive gear 26 revolves along the first direction 33, respectively.

The driven shaft 28 and the anchor rod 12 may be coaxially aligned in such a manner that the driven shaft 28 is concentrically disposed about a major longitudinal length of the anchor rod 12 such that the anchor rod 12 remains statically coupled to the casing 13 while the driven shaft 28 rotates with the brush head 23. In this manner, the splash guard 14 may be freely and independently rotated along the first arcuate path 31 while the handle 11 and anchor rod 12 are maintained at a static position so that the caregiver is able to maintain adequate leverage during cleaning procedures. In other words, the brush head 23 and the splash guard 14 are freely and independently rotated while the casing 13 is freely and independently rotated about the statically positioned anchor rod 12 and handle 11, respectively.

In one embodiment, the casing 13 may further include a notch 30 formed at an anterior face thereof. Such a notch 30 is adapted to receive the animal paw therethrough during cleaning procedures while the splash guard 14 is simultaneously biased towards a closed position.

Notably, the splash guard 14 is independently and freely pivotal about a first fulcrum axis 75, while the brush head 23 and the casing 13 are independently and freely pivotal about a second fulcrum axis 76. Such first and second fulcrum axes 75, 76 are registered parallel to each other wherein the second fulcrum axis 76 is centrally aligned with a longitudinal length of the anchor rod 12 and the driven shaft 28, respectively.

Figure 11:
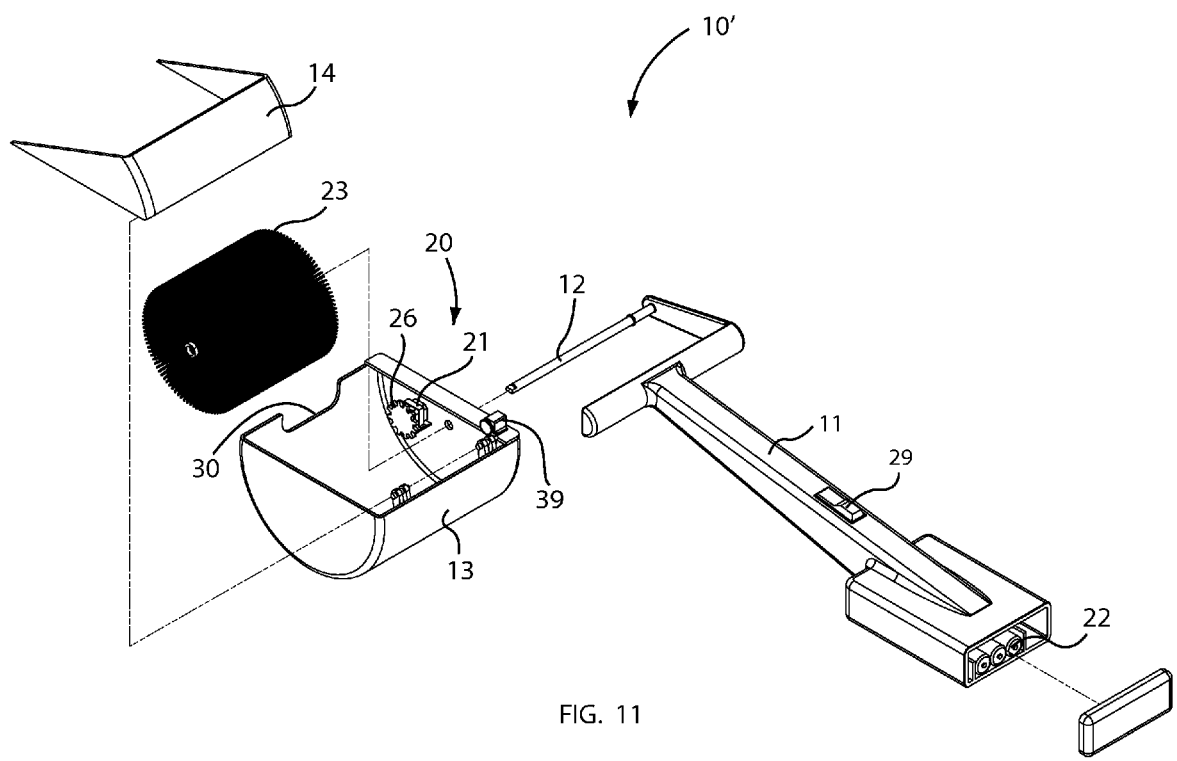
FIG. 11 is an exploded view of the alternate embodiment.
Figure 12:
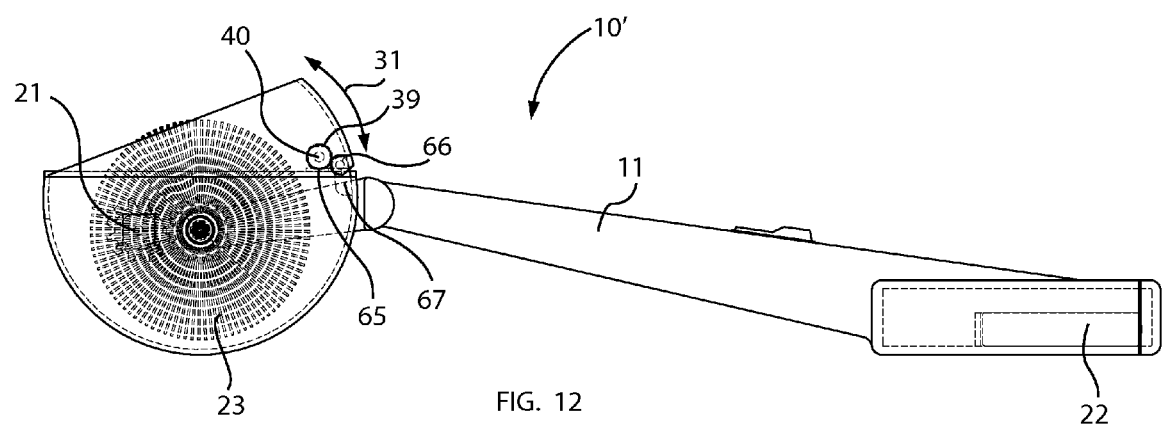
FIG. 12 is a side elevational view of the device shown in FIG. 11.
Figure 13:
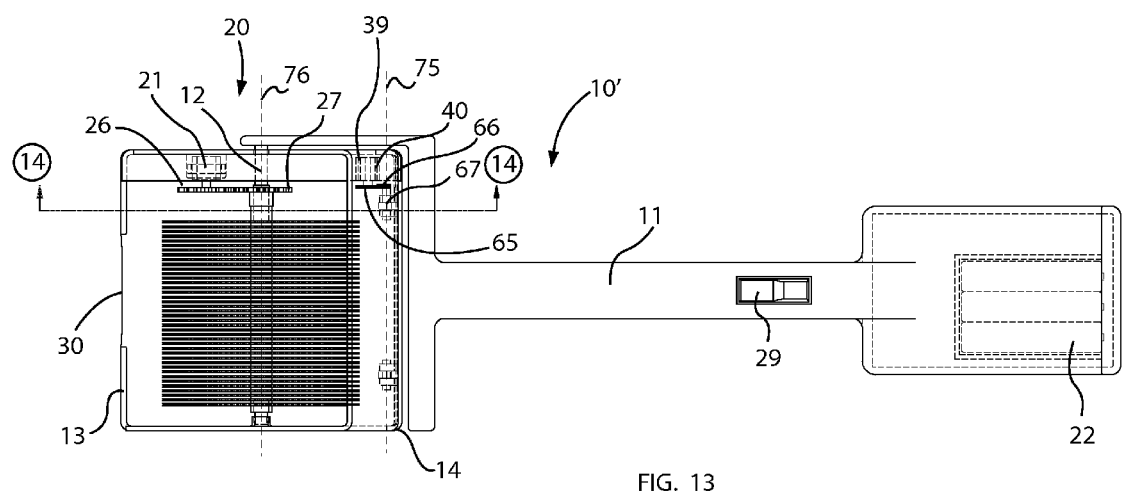
FIG. 13 is a top plan view of the device shown in FIG. 11.
Figure 14:
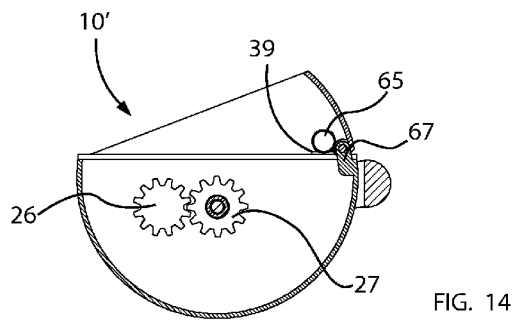
FIG. 14 is a cross-sectional view taken along line 14-14 in FIG. 13.

In an alternate embodiment 10', as perhaps best shown in FIGS. 10-16, the present invention may include a controller 39 positioned along an interior of the casing 13 and juxtaposed adjacent to the brush head 23, respectively. Such a controller 39 preferably receives an input signal from motor 21, which identifies the rotational velocity of the brush head 23 during operating conditions. An actuator 40 (such as a motor) is communicatively coupled to controller 39 and is responsive to the output signal therefrom.

The actuator 40 is operably engaged to a pair of gears 65, 66 (similar to the drive and driven gears 26, 27 of the paw cleaning mechanism 20) and causes same to rotate in corresponding directions upon receiving instructions from controller 39. Driven gear 66 is mated to a hinge 67 that causes rotational movement of splash guard 14 about the first fulcrum axis 75. In this manner, actuator 40 causes the splash guard 14 to automatically articulate along the first arcuate path 31 upon receiving instructions from controller 39, which learns the rotational velocity of the brush head 23.

The actuator 40 may be a motor that is articulate the drive and driven gears 26, 27 in alternating directions such that the splash guard 14 is repetitively biased along clockwise and counter-clockwise directions. Thus, the splash guard 14 automatically pivots towards open and closed positions as the rotational velocity of the brush head 23 decreases and increases, respectively. Such a functional relationship between the splash guard 14 and brush head 23 ensures that the cleaning solution is prevented from spraying on the caregiver as the velocity of the brush head 23 is selectively increased and decreased during grooming conditions.

The present invention may further include a method of utilizing a power-actuated animal paw cleaning device 10 for assisting a caregiver to groom an animal paw. Such a method preferably includes the chronological steps of: providing an elongated handle 11 having an anchor rod 12 statically coupled to a distal end thereof; providing and pivotally mating a casing 13 to the anchor rod 12 such that the casing 13 is freely pivotal thereabout while the handle 11 and anchor rod 12 remain stationary; providing and adjoining a splash guard 14 to an interior surface of the casing 13 by pivotally coupling the splash guard 14 to the anchor rod 12; providing and attaching a paw cleaning mechanism 20 to the casing 13 and the handle 11, respectively, by providing and rotatably situating a brush head 23 within the casing 13; independently articulating the splash guard 14 along a first arcuate path 31 while independently articulating the brush head 23 along a second arcuate path 32; and independently adjusting a rotational displacement of the splash guard 14 and a rotational velocity of the brush head 23, respectively, during grooming procedures.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A power-actuated animal paw cleaning system for assisting a caregiver to groom an animal paw, said power-actuated animal paw cleaning system comprising:
   a handle having an anchor rod statically coupled to a distal end thereof;
   a casing mated to said anchor rod such that said casing is pivotal thereabout while said handle and said anchor rod remain stationary;
   a splash guard indirectly coupled to said anchor rod and being adjoined to an interior surface of said casing respectively;
   a paw cleaning mechanism attached to said casing and said handle respectively, said paw cleaning mechanism being provided with a brush head situated within said casing;
   wherein said splash guard is articulated along a first arcuate path as said brush head articulates along a second arcuate path.

2. The power-actuated animal paw cleaning system of claim 1, further comprising: a reservoir containing a liquid cleaning solution therein, said liquid cleaning solution being adapted to be directly deposited onto a paw of the animal.

3. The power-actuated animal paw cleaning system of claim 2, wherein said rotational displacement of said splash guard is independently manipulated as said rotational velocity of said brush head is independently manipulated such that said splash guard articulates towards a closed position for prohibiting said cleaning solution from splattering beyond said distal end of said handle.

4. The power-actuated animal paw cleaning system of claim 1, wherein said splash guard is freely rotated along said first arcuate path while said handle is maintained at a static position so that the caregiver is able to maintain adequate leverage during cleaning procedures.

5. The power-actuated animal paw cleaning system of claim 1, wherein said paw cleaning mechanism further comprises:

a motor and a power source electrically coupled thereto;

a user interface communicatively coupled to said motor for selectively toggling said brush head between alternating rotational velocities.

6. The power-actuated animal paw cleaning system of claim 1, wherein said paw cleaning mechanism further comprises:

a drive gear directly connected to said motor and being caused to revolve along a first direction;

a driven gear directly connected to said drive gear and being caused to automatically revolve along a second direction when said drive gear revolves along said first direction; and a rectilinear driven shaft statically mated to said driven gear and rotatably supported within said casing respectively;

wherein said driven shaft is further mated to said brush head and thereby causes said brush head to revolve along said second direction when said drive gear revolves along said first direction respectively.

7. The power-actuated animal paw cleaning system of claim 6, wherein said driven shaft and said anchor rod are coaxially aligned such that said driven shaft is concentrically positioned about a major longitudinal length of said anchor rod, said anchor rod passing through said casing and being aligned to a fulcrum axis of said first arcuate path.

8. The power-actuated animal paw cleaning system of claim 7, wherein said splash guard is freely rotated about a second fulcrum axis registered parallel to said first fulcrum axis.

9. The power-actuated animal paw cleaning system of claim 1, wherein said casing comprises: a notch formed at an anterior face thereof, said notch being adapted to receive the animal paw therethrough during cleaning procedures while said splash guard is simultaneously biased towards a closed position.

10. A power-actuated animal paw cleaning system for assisting a caregiver to groom an animal paw, said power-actuated animal paw cleaning system comprising:

a handle having an anchor rod statically coupled to a distal end thereof;

a casing mated to said anchor rod such that said casing is freely pivotal thereabout while said handle and said anchor rod remain stationary;

a splash guard indirectly coupled to said anchor rod and being adjoined to an interior surface of said casing respectively; and a paw cleaning mechanism attached to said casing and said handle respectively, said paw cleaning mechanism being provided with a brush head rotatably situated within said casing;

wherein said splash guard is freely articulated along a first arcuate path as said brush head articulates along a second arcuate path.

11. The power-actuated animal paw cleaning system of claim 10, further comprising: a reservoir containing a liquid cleaning solution therein, said liquid cleaning solution being adapted to be directly deposited onto a paw of the animal.

12. The power-actuated animal paw cleaning system of claim 11, wherein said rotational displacement of said splash guard is independently manipulated as said rotational velocity of said brush head is independently manipulated such that said splash guard articulates towards a closed position for prohibiting said cleaning solution from splattering beyond said distal end of said handle.

13. The power-actuated animal paw cleaning system of claim 10, wherein said splash guard is freely rotated along said first arcuate path while said handle is maintained at a static position so that the caregiver is able to maintain adequate leverage during cleaning procedures.

14. The power-actuated animal paw cleaning system of claim 10, wherein said paw cleaning mechanism further comprises:

a motor and a power source electrically coupled thereto;

a user interface communicatively coupled to said motor for selectively toggling said brush head between alternating rotational velocities.

15. The power-actuated animal paw cleaning system of claim 10, wherein said paw cleaning mechanism further comprises:

a drive gear directly connected to said motor and being caused to revolve along a first direction;

a driven gear directly connected to said drive gear and being caused to automatically revolve along a second direction when said drive gear revolves along said first direction; and a rectilinear driven shaft statically mated to said driven gear and rotatably supported within said casing respectively;

wherein said driven shaft is further mated to said brush head and thereby causes said brush head to revolve along said second direction when said drive gear revolves along said first direction respectively.

16. The power-actuated animal paw cleaning system of claim 15, wherein said driven shaft and said anchor rod are coaxially aligned such that said driven shaft is concentrically positioned about a major longitudinal length of said anchor rod, said anchor rod passing through said casing and being aligned to a fulcrum axis of said first arcuate path.

17. The power-actuated animal paw cleaning system of claim 16, wherein said splash guard is freely rotated about a second fulcrum axis registered parallel to said first fulcrum axis.

18. The power-actuated animal paw cleaning system of claim 10, wherein said casing comprises: a notch formed at an anterior face thereof, said notch being adapted to receive the animal paw therethrough during cleaning procedures while said splash guard is simultaneously biased towards a closed position.

19. A method of utilizing a power-actuated animal paw cleaning system for assisting a caregiver to groom an animal paw, said method comprising the chronological steps of:

providing an elongated handle having an anchor rod statically coupled to a distal end thereof;

providing and pivotally mating a casing to said anchor rod such that said casing is freely pivotal thereabout while said handle and said anchor rod remain stationary;

providing and adjoining a splash guard to an interior surface of said casing by pivotally coupling said splash guard indirectly to said anchor rod;

providing and attaching a paw cleaning mechanism to said casing and said handle respectively by providing and rotatably situating a brush head within said casing;

independently articulating said splash guard along a first arcuate path while independently articulating said brush head along a second arcuate path; and independently adjusting a rotational displacement of said splash guard and a rotational velocity of said brush head during grooming procedures.

* * * * *